United States Patent [19]

Penn et al.

[11] Patent Number: 4,888,813
[45] Date of Patent: Dec. 19, 1989

[54] ELECTRONIC SPEED CONTROL INTERLOCK

[75] Inventors: Paul E. Penn, Indianapolis; Gary R. Grissom, Zionsville, both of Ind.

[73] Assignee: Dart Controls, Inc., Zionsville, Ind.

[21] Appl. No.: 170,828

[22] Filed: Mar. 21, 1988

[51] Int. Cl.⁴ .............................................. H02P 5/06
[52] U.S. Cl. .................................... 388/838; 388/917; 318/446; 318/465
[58] Field of Search ............................ 318/306–318, 318/339–349, 101–103, 272, 275, 445–446, 447, 461, 465; 388/825–827, 828, 830, 838–840, 917–919, 921

[56] References Cited

U.S. PATENT DOCUMENTS

| | | | |
|---|---|---|---|
| 3,875,486 | 4/1975 | Barton | 318/341 |
| 4,309,645 | 1/1982 | De Villeneave | 318/341 |
| 4,386,301 | 5/1983 | Neki et al. | 312/318 |

Primary Examiner—William M. Shoop, Jr.
Assistant Examiner—David S. Martin
Attorney, Agent, or Firm—Barnes & Thornburg

[57] ABSTRACT

A motor controller for use on a treadmill to prohibit the treadmill from operating at a high speed immediately upon energization. The controller uses solid state circuitry in a motor speed circuit with a speed setting potentiometer set by the user. The system is adapted so as upon energization a minimum speed is initially achieved. The results are obtained with the interaction of a buffer circuit, solid state circuitry, and an SCR motor speed control circuit.

4 Claims, 1 Drawing Sheet

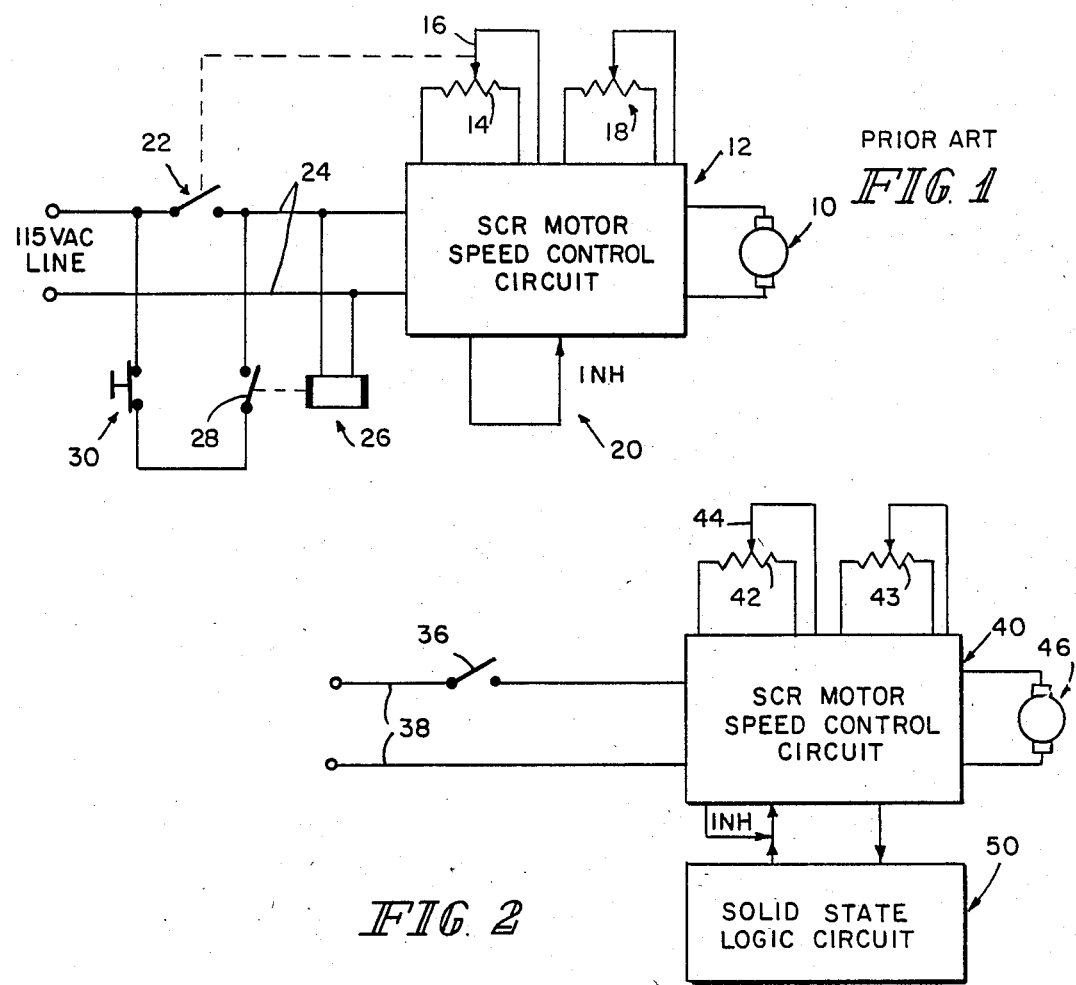
PRIOR ART
FIG. 1
FIG. 2
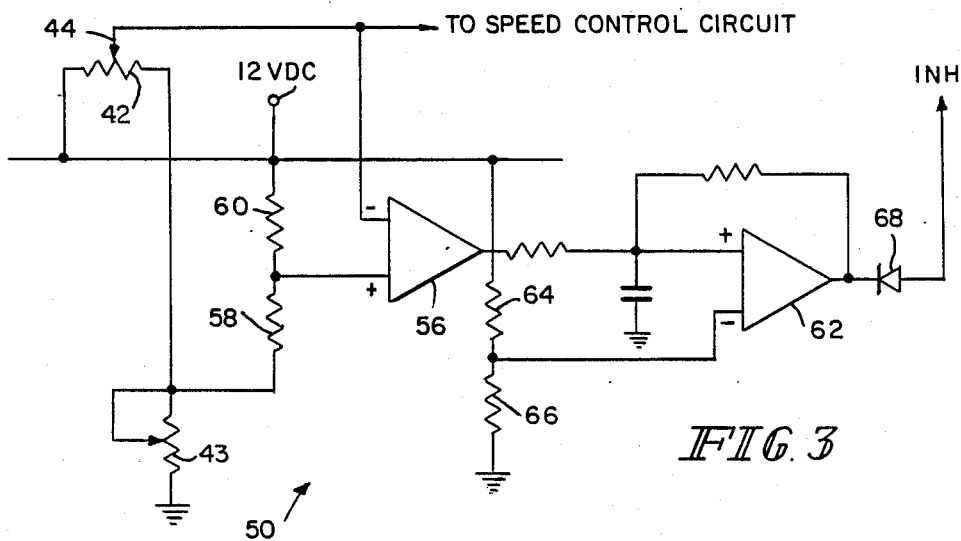
FIG. 3

ELECTRONIC SPEED CONTROL INTERLOCK

This invention relates to motor speed control circuits and particularly to a solid state circuit for initializing a motor speed control at a lowest desired speed.

In certain electric motor applications, such as exercise treadmills, it is of some importance from a safety standpoint to be certain that control of the motor which drives the exercise treadmill be initialized at zero feet per second or at some other appropriate minimum desired speed. To do otherwise risks throwing the user from the treadmill and/or otherwise injuring the user.

Most manufacturers of exercise treadmills have incorporated certain circuits into their treadmill electric motor controllers. These circuits include a line relay powered through a switch which is actuable only by resetting the treadmill speed potentiometer to zero or some other appropriate minimum speed. When the line relay is so actuated, it typically pulls in a pair of normally open contacts to latch the power on. Then the speed control potentiometer can be moved to whatever speed is desired. However, at least initially the speed control must be set to some minimum speed in order to get the treadmill moving.

According to the invention, a motor controller is provided for use on a treadmill, the user of which does not want the treadmill to begin operating at high speed immediately upon energization. The controller includes a speed setting potentiometer, a motor speed control circuit, and means for coupling the speed setting potentiometer to the speed control circuit so that speed setting potentiometer position controls motor speed thereby controlling treadmill speed. The means for coupling the speed setting potentiometer to the speed control circuit includes a solid state logic circuit having a first condition and a second condition, and means for coupling the speed setting potentiometer to the solid state logic circuit. The first condition of the solid state logic circuit indicates that the speed setting potentiometer is not in a position corresponding to a minimum speed condition of the motor and thereby of the treadmill. The second condition of the solid state logic circuit indicates that the speed setting potentiometer is in a position corresponding to a minimum speed condition of the motor and thereby of the treadmill. A buffer circuit couples the condition of the solid state logic circuit to the speed control circuit.

Illustratively, the controller further includes means for providing a minimum desired speed signal to the motor controller.

According to the illustrated embodiment, the solid state logic means comprises a solid state comparator having two input terminals and an output terminal, means for coupling the minimum speed providing means to one of the input terminals and means for coupling the speed setting potentiometer to the other of the input terminals. Comparison of the two inputs which results in the conclusion that the speed setting potentiometer is not adjusted substantially to the minimum speed places the solid state logic circuit in the first condition. Comparison of the two inputs which results in the conclusion that the speed-setting potentiometer is adjusted substantially to the minimum speed places the solid state logic circuit in the second condition.

Additionally according to the illustrated embodiment, the buffer comprises a flip-flop having two input terminals and an output terminal, means for coupling one of the input terminals of the flip-flop to the output terminal of the comparator, means for generating a threshold voltage level, means for coupling the threshold level generating means to the other of the input terminals of the flip-flop and means for coupling the output terminal of the flip-flop to the speed control circuit. The flip-flop output terminal has a first condition in which the speed control circuit is inhibited when the signal on said one of the input terminals of the flip-flop does not exceed the threshold level generated by the threshold level generating means, and a second condition in which the speed control circuit is uninhibited when the signal on said one of the input terminals of the flip-flop exceeds the threshold level generated by the threshold level generating means.

The invention may best be understood by referring to the following description and accompanying drawings which illustrate the invention. In the drawings:

FIG. 1 illustrates in partly block and partly schematic circuit diagram form a prior art circuit for initializing an exercise treadmill;

FIG. 2 illustrates in partly block and partly schematic circuit diagram form a circuit according to the present invention for initializing an exercise treadmill; and, FIG. 3 illustrates in partly block and partly schematic circuit diagram form certain details of the circuit of FIG. 2.

Turning now to FIG. 1, and as previously discussed, an exercise treadmill drive motor 10, typically a DC motor, is driven from a voltage supply, typically a 115 VAC line, through a motor speed control circuit 12 which is typically an SCR-based motor controller. Such a circuit 12 typically includes a desired speed potentiometer 14, with the desired speed being represented as, and carried by, a DC voltage level on the wiper 16 of the potentiometer 14. In addition, the prior art treadmill controller conventionally has a minimum desired speed set potentiometer 18. This permits the minimum speed of the treadmill to be selected. It may be set at zero feet per second or at some very slow speed. Currently available exercise treadmill motor controllers ordinarily process internally certain internally generated "inhibit" signals such as, for example, a handgrip interlock. Such an interlock would prevent the treadmill from starting up unless the user had a grip on the treadmill handgrip and had pulled the handgrip to operate the treadmill. Other such inhibit signals may also come from other sources on the treadmill. Such inhibit signals are represented collectively at 20 in FIG. 1.

In the prior art, in order that the treadmill not start up at too high a speed, possibly resulting in injury to the user, a switch 22 was provided in the line 24 in series with the controller 12. Switch 22 was tied to the position of the wiper 16 of potentiometer 14 such that switch 22 would only close if the wiper 16 were in its lowest speed position. Once switch 22 closed, current would flow through the coils 26 of a relay across the line 24, closing the normally open contacts 28 of that relay and latching the controller 12 on. Then the speed setting of potentiometer 14 could be adjusted to whatever was desired, but at least initially the motor 10 speed was required to be a minimum to actuate the treadmill. A switch 30 was then used to turn off the treadmill.

This system works well. However, it requires a line relay 26, 28 and a potentiometer-ganged switch 22, and thus is rather expensive. Applicant has determined that these fairly expensive components can be replaced by much less expensive solid state circuitry which performs the same function at a much lower cost. Specifically, and with reference to FIG. 2, the line relay 26, 28 and potentiometer-ganged switch 22 are eliminated. A single on-off switch 36 controls the supply of power from the 115 VAC line 38 to an SCR motor speed control circuit 40 which may be virtually identical to that illustrated at 12 in FIG. 1. Circuit 40 includes a desired speed potentiometer 42 which is the equivalent of potentiometer 14 in FIG. 1, as well as a minimum speed set potentiometer 43 which is the equivalent of potentiometer 18 in FIG. 1. The wiper 44 of potentiometer 42 carries a DC voltage level corresponding to desired motor speed. This signal is supplied to circuit 40 to control the speed of the treadmill motor 6 which is coupled to circuit 40 to be controlled thereby. Also as in the embodiment of FIG. 1, some one or more inhibit signals are generated within the speed control circuit 40 and are supplied to an inhibit terminal of it. In addition, certain signals are supplied from speed control circuit 40 to a solid state logic circuit 50 which replaces line relay 26, 28 and switch 22 of FIG. 1, and an additional inhibit signal is supplied from circuit 50 back to the inhibit input terminal of circuit 40. The nature of these signals is best understood with reference to FIG. 3.

Switch 36 controls the supply of power from the 115 VAC line not only to SCR motor speed control circuit 40, but also controls a low voltage DC supply, for example 12 VDC, to circuit 50. One terminal of a 5K potentiometer 42 is coupled to the 12 VDC supply. One terminal of potentiometer 42 is coupled through a minimum desired speed set 5K potentiometer 43 to ground. The wiper 44 of potentiometer 42, in addition to being coupled in the conventional manner to the motor speed control circuit 40 is also coupled to an input terminal, illustratively the inverting, or −, input terminal, of a solid state logic circuit 56, illustratively a comparator. The junction of potentiometers 42, 43 is coupled through series 10K and 1.2M resistors 58, 60, respectively, to 12 VDC, and the common terminal of resistors 58, 60 is coupled to the +input terminal of comparator 56.

The output terminal of comparator 56 is coupled through a 100K resistor and 0.01μF capacitor to ground. The junction of these is coupled to the +input terminal of a comparator 62, the output signal from which is fed back positively through a 100K resistor to its + input terminal. The − input terminal of comparator 62 is coupled to the common terminal of a 100K resistor 64 and a 68K resistor 66. The remaining terminal of resistor 64 is coupled to 12 VDC. The remaining terminal of resistor 66 is coupled to ground. The output terminal of comparator 62 is coupled to the cathode of a diode 68, the anode of which supplies the additional inhibit signal to the inhibit terminal of SCR speed control circuit 40. Comparator 62 and its associated passive components constitute a flip-flop which acts as a buffer between comparator 56 and the inhibit line.

In operation, potentiometer 43 establishes the minimum desired speed for motor 46 and thus for the treadmill driven thereby. Potentiometer 42 controls the motor 46 speed above this minimum. Upon closing of the switch 36, if the wiper 44 of potentiometer 42 is not set at or near its lowest setting, the voltage at the input − input terminal of comparator 56 exceeds that at the + input terminal thereof. The output terminal of comparator 56 will remain at a low voltage as will the output terminal of comparator 62 and the inhibit terminal of circuit 40. Circuit 40 will be inhibited as a consequence and the treadmill will not move.

Reducing the setting of wiper 44 toward its minimum speed setting will ultimately result in the voltage on the + terminal of comparator 56 exceeding that at its − input terminal. The output voltages from comparators 56, 62 will increase as a result and the SCR speed control circuit 40 will be uninhibited, at least with regard to the circuitry of FIG. 3.

What is claimed is:

1. A motor controller for use on a treadmill to prohibit the treadmill from operating at high speed immediately upon energization, the controller including a speed setting potentiometer, a motor speed control circuit, and means for coupling the speed setting potentiometer to the speed control circuit so that the speed setting potentiometer's position controls motor speed thereby controlling treadmill speed, the means for coupling the speed setting potentiometer to the speed control circuit includes a solid state logic circuit having a first condition and a second condition, means for coupling the speed setting potentiometer to the solid state logic circuit, means for providing a minimum speed-related signal for the motor, means for coupling the minimum speed-related signal providing means to the solid state logic circuit, the first condition of the solid state logic circuit indicating that the speed setting potentiometer is not in a position corresponding to a minimum speed condition of the motor and thereby of the treadmill, the second condition of the solid state logic circuit indicating that the speed setting potentiometer is in a position corresponding to a minimum speed condition of the motor and thereby of the treadmill, a buffer circuit for coupling the condition of the solid state logic circuit to the speed control circuit, means for coupling the buffer circuit to the solid state logic circuit, and means for coupling the buffer circuit to the speed control circuit.

2. A motor controller for use on a treadmill to prohibit the treadmill from operating at high speed immediately upon energization, the controller including a speed setting potentiometer, a motor speed control circuit, and means for coupling the speed setting potentiometer to the speed control circuit so that the speed setting potentiometer's position controls motor speed thereby controlling treadmill speed, the means for coupling the speed setting potentiometer to the speed control circuit includes a solid state logic circuit having a first condition and a second condition, means for providing a minimum speed-related signal for the motor, the first condition of the solid state logic circuit indicating that the speed setting potentiometer is not in a position corresponding to a minimum speed condition of the motor and thereby of the treadmill, the second condition of the solid state logic circuit indicating that the speed setting potentiometer is in a position corresponding to a minimum speed condition of the motor and thereby of the treadmill, a buffer circuit for coupling the condition of the solid state logic circuit to the speed control circuit, means for coupling the buffer circuit to the solid state logic circuit, and means for coupling the buffer circuit to the speed control circuit, the solid state logic circuit comprising a solid state comparator having two input terminals and an output terminal, means for coupling the minimum speed-related signal providing means to one of the input terminals and means for coupling the speed setting potentiometer to the other of the input terminals, comparison of the two inputs resulting in the conclusion that the speed setting potentiometer is not adjusted substantially to the minimum speed placing the solid state logic circuit in the first condition and comparison of the two inputs resulting in the conclusion that the speed-setting potentiometer is adjusted substantially to the minimum speed placing the solid state logic circuit in the second condition.

3. The apparatus of claim 2 wherein the buffer comprises a flip-flop having two input terminals and an output terminal, means for coupling one of the input terminals of the flip-flop to the output terminal of the comparator, means for generating a threshold voltage level, means for coupling the threshold level generating means to the other of the input terminals of the flip-flop and means for coupling the output terminal of the flip-flop to the speed control circuit, the flip-flop output terminal having a first condition in which the speed control circuit is inhibited when the signal on said one of the input terminals of the flip-flop does not exceed the threshold level generated by the threshold level generating means and a second condition in which the speed control circuit is uninhibited when the signal on said one of the input terminals of the flip-flop exceeds the threshold level generated by the threshold level generating means.

4. A motor controller for use on a treadmill to prohibit the treadmill from operating at high speed immediately upon energization, the controller including a speed setting potentiometer, a motor speed control circuit having one or more input terminals including an inhibit input terminal and a pair of output terminals across which a motor for driving the treadmill is coupled, and means for coupling the speed setting potentiometer to the motor speed control circuit so that the speed setting potentiometer's position controls motor speed thereby controlling treadmill speed, the means for coupling the speed setting potentiometer to the speed control circuit includes means for establishing a minimum desired motor speed signal, a comparator, means for coupling the minimum desired motor speed signal to one input terminal of the comparator, means for coupling the speed setting potentiometer to the other input terminal of the comparator, a flip-flop having two input terminals and an output terminal, means for coupling one input terminal of the flop-flop to the output terminal of the comparator, means for establishing a threshold voltage level, means for coupling the threshold voltage level establishing means to the other input terminal of the flip-flop, and means for coupling the output terminal of the flip-flop to the inhibit input terminal of the motor speed control circuit.

* * * * *